United States Patent
Davison et al.

(10) Patent No.: US 6,434,402 B1
(45) Date of Patent: Aug. 13, 2002

(54) ACCESSORY DEVICE FOR HANDLING MULTIPLE CALLS ON MULTIPLE MOBILE STATIONS

(75) Inventors: Lee Davison, McKinney; Eric Valentine, Plano; Pam Ewing, Wylie, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/434,758

(22) Filed: Nov. 4, 1999

(51) Int. Cl.[7] .................................................. H04B 1/38
(52) U.S. Cl. ........................ 455/555; 455/554; 455/569
(58) Field of Search ............................... 379/157, 158, 379/308, 309; 455/422, 552, 41, 416, 569, 556, 557, 554, 555, 550, 568

(56) References Cited

U.S. PATENT DOCUMENTS

| | | | | |
|---|---|---|---|---|
| 4,665,545 A | * | 5/1987 | Galensky et al. | ............ 379/158 |
| 4,930,148 A | * | 5/1990 | Lee | ............................... 379/58 |
| 4,955,050 A | * | 9/1990 | Yamauchi | ...................... 379/59 |
| 5,787,355 A | * | 7/1998 | Banniister et al. | ........... 455/458 |
| 5,854,977 A | * | 12/1998 | Oksanen et al. | ............. 455/417 |
| 6,035,026 A | * | 3/2000 | Kim | ............................. 379/202 |
| 6,263,200 B1 | * | 7/2001 | Fujimoto | ..................... 455/343 |
| 6,275,707 B1 | * | 8/2001 | Reed et al. | .................. 455/456 |
| 6,349,212 B1 | * | 2/2002 | Martensson et al. | ......... 455/462 |

* cited by examiner

Primary Examiner—Thanh Cong Le
Assistant Examiner—Tuan Tran
(74) Attorney, Agent, or Firm—Jenkens & Gilchrist, P.C.

(57) ABSTRACT

An accessory device for a mobile station is disclosed that allows one or more mobile subscribers to conveniently and simply use two or more mobile stations at the same time. In addition, the accessory device also provides the ability to bridge the two or more calls into a multi-party call. The accessory device includes two or more connectors, each having a plug on either end. One plug of each connector is inserted into the hands-free port of each mobile station, while the other plug is inserted into the accessory device. The plug that is inserted into the accessory device attaches to leads to a single speaker/microphone combination in the accessory device. The accessory device also includes at least one switch to allow the mobile subscriber to select between the calls or establish a bridge between all of the calls.

30 Claims, 3 Drawing Sheets

ACCESSORY DEVICE FOR HANDLING MULTIPLE CALLS ON MULTIPLE MOBILE STATIONS

BACKGROUND OF THE PRESENT INVENTION

1. Field of the Invention

The present invention relates generally to accessory devices for mobile stations and particularly to accessory devices for handling multiple calls on multiple mobile stations.

2. Background of the Present Invention

In today's cellular marketplace, a mobile subscriber may have more than one subscription to a cellular service and separate mobile stations for each subscription. Alternatively, a mobile subscriber may have more than one mobile station per subscription. For example, even though many businesses now provide employees with a mobile station and associated subscription for work-related calls, the employee may also maintain a separate mobile station and associated subscription for personal calls.

For heavy users of cellular telecommunications, it is not unusual for a mobile subscriber to have more than one mobile station actively involved in a call at a time. For example, the subscriber might receive a call on one mobile station during the time that the mobile subscriber is involved in a call on another mobile station. Alternatively, a call may be originated on one mobile station, while a second call is received on another mobile station. As another example, a conversation in progress on one mobile station may cause the initiation of a call on another mobile station.

However, in most cases, it is awkward and confusing for a mobile subscriber to use more than one mobile station at the same time. For example, it may require the mobile subscriber to put down one of the mobile stations in order to talk on the other mobile station, or the mobile subscriber may have to hold both of the mobile stations, one to each ear, in order to listen and speak simultaneously on both. In some situations, this may even represent a safety hazard.

Likewise, a problem also exists in the case where the mobile stations are not owned by the same mobile subscriber, but instead are owned by different mobile subscribers, each of whom are present and wish to actively engage in conversation on theirs and the other mobile subscriber's mobile stations. In these situations, it is usually not possible for a mobile subscriber to talk on his or her mobile station, while at the same time engaging in conversation on another mobile subscriber's mobile station, especially if the other mobile subscriber is also talking on his or her mobile station.

The only way to currently effectively handle multiple calls on multiple mobile stations simultaneously is to either not receive or originate one of the calls, or terminate one of the calls once more than call is established. Consequently, the calls that are not received or originated may never be made, resulting in lost revenue for the cellular network operator for the unrealized air time. Alternatively, the calls that are not received or originated may be postponed, inconveniencing both the calling and called subscribers.

SUMMARY OF THE INVENTION

The present invention is directed to an accessory device for a mobile station that allows one or more mobile subscribers to conveniently and simply use two or more mobile stations at the same time. In addition, the accessory device also provides the ability to bridge the two or more calls into a multi-party call. The accessory device includes two or more connectors, each having a plug on either end. One plug of each connector is inserted into the hands-free port of each mobile station, while the other plug is inserted into the accessory device. The plug that is inserted into the accessory device attaches to a single speaker/microphone combination in the accessory device. Alternatively, a hands-free headset can be used instead of a built-in speaker/microphone. The accessory device also includes at least one switch to allow the mobile subscriber to select between the calls or to establish a bridge between all of the calls. In an alternative embodiment, the accessory device can communicate with each of the mobile stations wirelessly.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
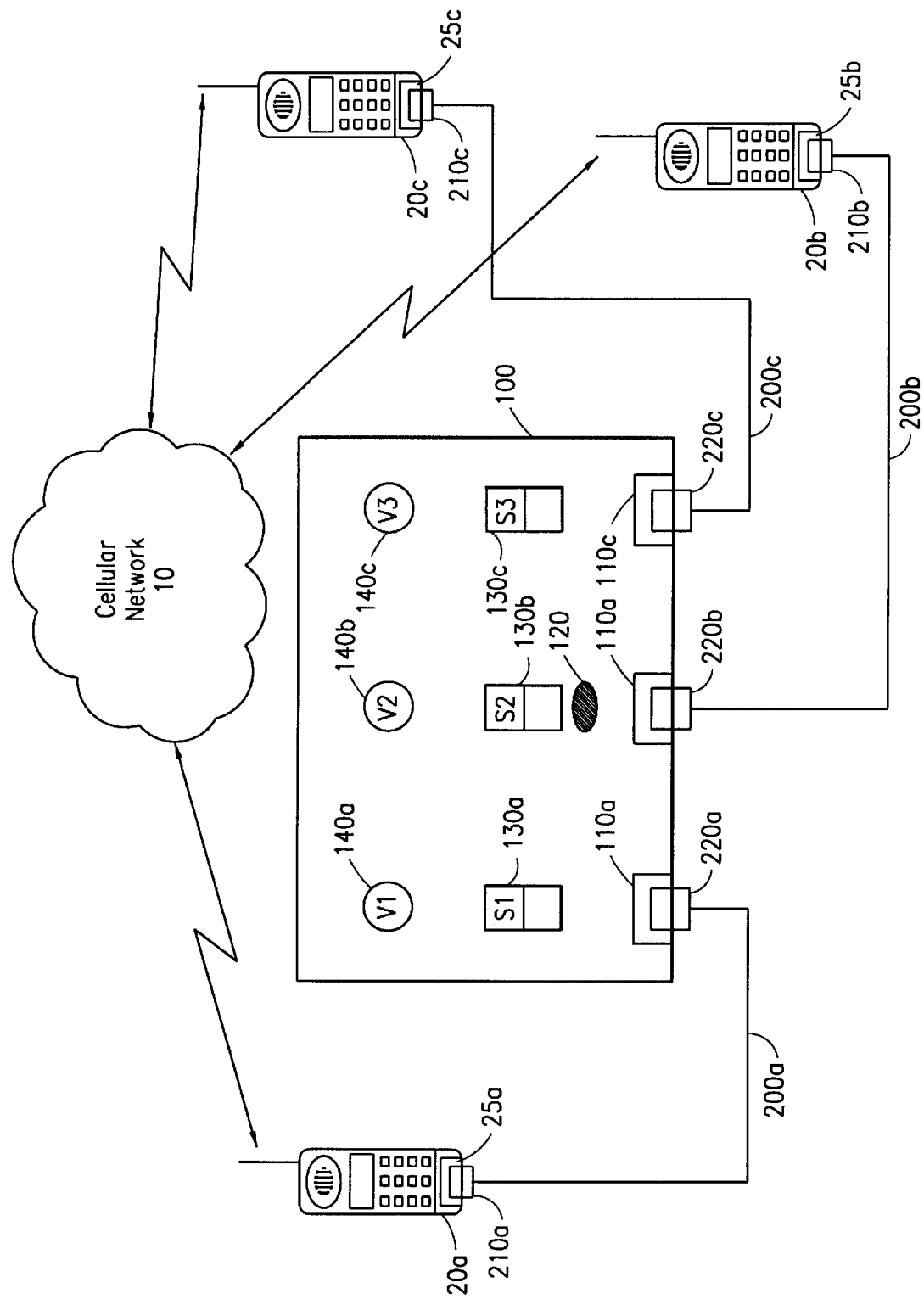
FIG. 1 is an exemplary diagram of an accessory device for handling multiple calls on multiple mobile stations, in accordance with preferred embodiments of the present invention.

With reference now to FIG. 1 of the drawings, an accessory device 100 for handling multiple calls on multiple mobile stations 20a–c is shown. The accessory device 100 allows one or more mobile subscribers to use two or more mobile stations 20a–c, at the same time, with convenience and simple operation. For example, a mobile subscriber may be actively involved on a call on one mobile station 20a, and receive a call on another mobile station 20b associated with that mobile subscriber. Alternatively, one mobile subscriber may be involved in a call on one mobile station 20a and another mobile subscriber may be involved in a call on another mobile station 20b.

To switch between the calls effectively or to bridge the calls together into a multi-party call, the mobile subscriber(s) can insert a first plug 210a on one end of a first connector 200a into a hands-free port 25a of a first mobile station 20a and a second plug 220a on the opposite end of the first connector 200a into a first port 110a in the accessory device 100. A second connector 200b is used for the second mobile station 20b, a third connector 200c is used for the third mobile station 20c, and so on, until all of the mobile stations 20a–c involved are connected into the accessory device 100 or until all of the ports 110a–c on the accessory device 100 are connected to mobile stations 20a–c.

Since the physical configuration of the hands-free ports 25a–c varies across mobile station 20a–c models, the connectors 200a–c may be modular in design. For example, in one modular configuration, the connectors 200a–c can be produced and purchased separately, with each having a different plug 210a–c on one end to match the respective mobile station's hands-free port 25a–c, and a standardized plug 220a–c on the other end to connect to the accessory device 100. In another configuration, standard connectors 200a–c can be included with the accessory device 100, requiring the mobile subscriber(s) to purchase individual plug adapters (not shown) for each mobile station 20a–c manufacturer or model line.

It should be understood that each of the mobile stations 20a–c connected to the accessory device 100 has a wireless call connection to a respective cellular network 10, only one of which is shown. Therefore, once all of the mobile stations 20a–c have been connected to the accessory device 100, in order to switch between the calls, the mobile subscriber(s) must activate at least one switch 130a–c on the accessory device 100.

Preferably, as shown in FIG. 1, each port 110a–c on the accessory device 100 has a separate switch 130a–c, respectively, associated therewith. For example, if the mobile subscriber(s) wants to select the call on the first mobile station 20a, the mobile subscriber(s) can depress the switch 130a associated with the port 110a that the first mobile station 20a is connected to. As another example, the mobile subscriber(s) can select a particular call by moving the respective switch 130a to an "on" position. Alternatively, any type of switch 130a–c can be used to select between the calls.

If the mobile subscriber(s) wants to connect one or more of the calls together into a multi-party call, the mobile subscriber(s) can activate the switches 130a–c for each of the mobile stations 20a–c that the mobile subscriber(s) want to involve in the multi-party call. For example, if the mobile subscriber(s) would like only the first and second mobile stations 20a and 20b, respectively, connected to the accessory device 100 to be involved in the multi-party call, the mobile subscriber(s) would activate only the first and second switches 130a and 130b, respectively. Alternatively, instead of activating separate switches 130a–c for each call, a single multi-party call switch (not shown) could be provided on the accessory device 100. However, if a single multi-party call switch is included, all of the calls for all of the mobile stations 20a–c connected to the accessory device 100 would have to be bridged together. Thus, in this case, selectively bridging together certain calls would not be possible.

Once the mobile subscriber has selected one or more of the calls by activating one or more of the switches 130a–c, the mobile subscriber can engage in conversation on each of the selected calls by listening to and speaking into a single speaker/microphone combination 120. The volume of the speech received on each call can be controlled separately by separate volume dials 140a–c for each of the switches 130a–c, respectively. Therefore, advantageously, the mobile subscriber(s) does not need to adjust the volume on the mobile stations 20a–c. Alternatively, a single volume dial (not shown) can be provided, in which case, the volume on each call would be the same.

Figure 2:
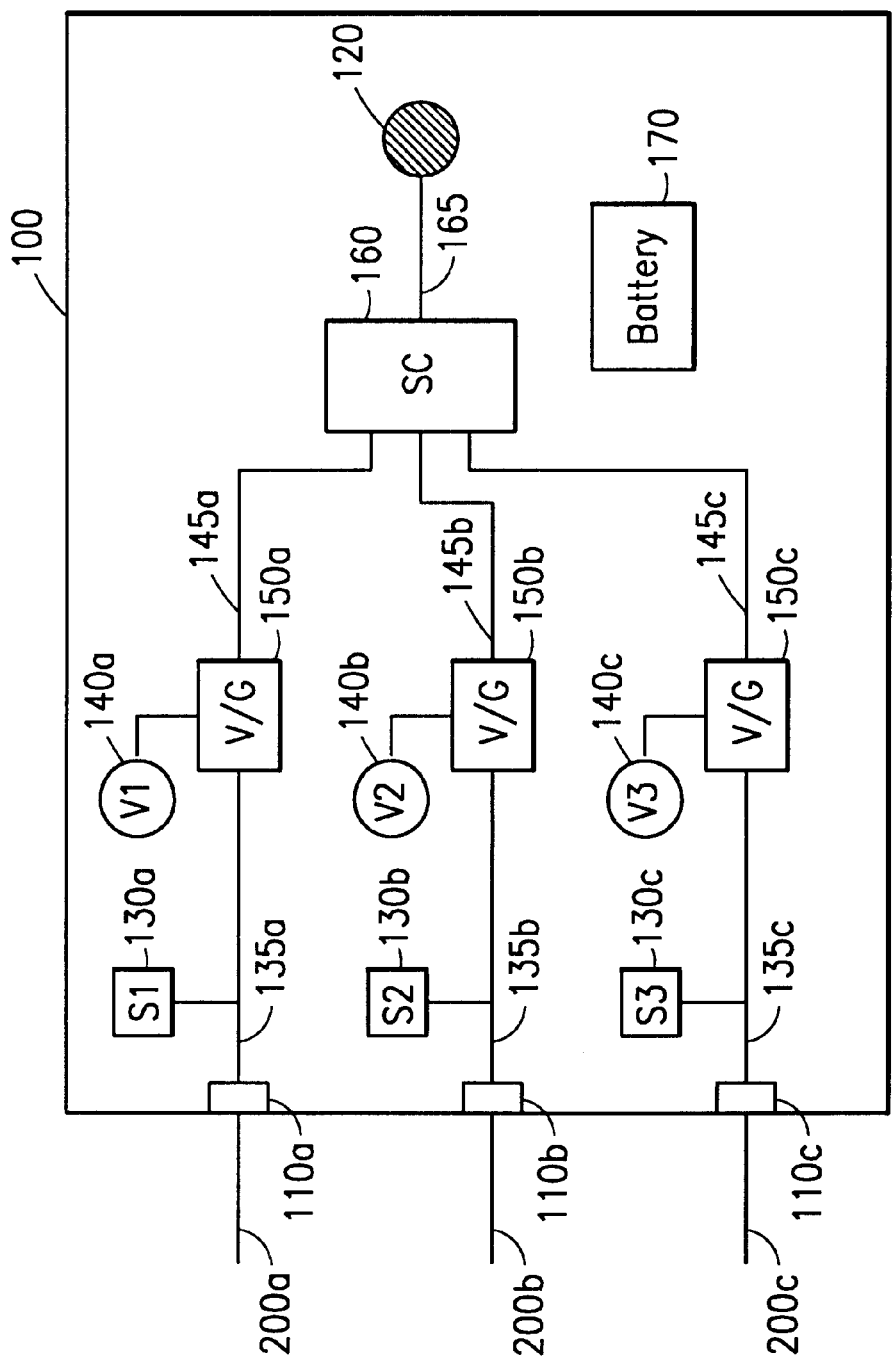
FIG. 2 is a block diagram of the interior of the accessory device shown in FIG. 1.

With reference now to FIG. 2 of the drawings, a more detailed interior view of the accessory device 100 is shown. Each accessory device port 110a–c is connected to a respective line 135a–c that leads to respective volume and gain circuitry 150a–c. The volume and gain circuitry 150a–c can be, for example, pre-amplification stages. Preferably, the volume and/or gain is set on a per-line 135a–c basis, in which case, a separate volume dial 140a–c controls each volume and gain circuitry 150a–c, respectively. Alternatively, as discussed above, a single volume dial (not shown) can control a single volume and gain circuitry (not shown). In this case, each line 135a–c leading from the ports 110a–c would connect to the single volume and gain circuitry.

In preferred embodiments, each volume and gain circuitry 150a–c is connected to switching circuitry 160 over lines 145a–c. The switching circuitry 160 is responsible for connecting two or more calls together into a multi-party call. To bridge the calls together, the switching circuitry 160 preferably includes speech path electronics.

Each port 110a–c that has a respective connector 200a–c plugged into it receives speech from the respective mobile station 20a–c (shown in FIG. 1) and transmits that speech over respective lines 135a–c. Each line 135a–c is controlled by a respective switch 130a–c. If a switch, for example, switch 130a, is activated for a particular line 135a, the speech received at the port 110a for that particular line 135a is transmitted over the line 135a to the respective volume and gain circuitry 150a. Once amplified, the amplified speech is transmitted over line 145a from the volume and gain circuitry 150a to the switching circuitry 160. If amplified speech is received on two or more lines, for example, lines 145a and 145b, the switching circuitry 160 bridges the speech together into a multi-party call. Otherwise, if amplified speech is received on only one line, such as line 145a, the switching circuitry 160 simply transmits this amplified speech.

Once the amplified speech has passed through the switching circuitry 160, the amplified speech is transmitted to the combined speaker/microphone 120 over line 165. Likewise, speech received at the speaker/microphone 120 is transmitted over line 165 to the switching circuitry 160, and subsequently over lines 135a–c to the respective ports 110a–c for each of the selected mobile stations 20a–c (shown in FIG. 1).

Optimum performance of the bridging function may also require the incorporation of a battery 170, due to the decibel (dB) drop and impedance change from the addition of the speech path electronics. The battery 170 can be a portable battery that can be easily removed from the accessory device 100 to be recharged, or the battery 170 can be included within the accessory device 100 and replaced as needed.

Figure 3:
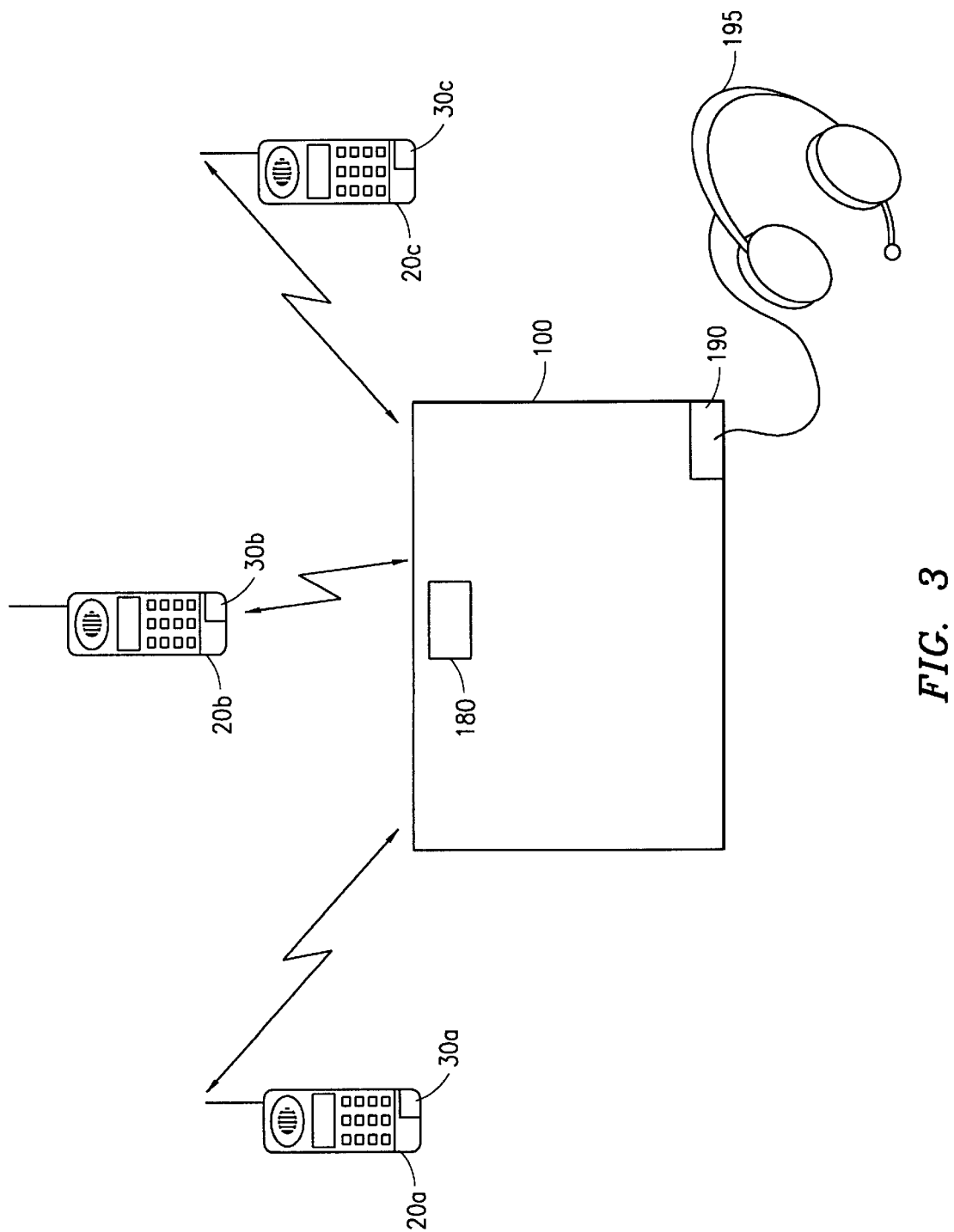
FIG. 3 is an exemplary block diagram of the accessory device communicating wirelessly with each of the mobile stations, in accordance with alternative embodiments of the present invention.

With reference now to FIG. 3 of the drawings, in an alternative embodiment, the mobile stations 20a–c can be wireless connected to the accessory device 100. In this embodiment, each of the mobile stations 20a–c has a transceiver 30a–c, respectively, therein for transmitting speech to and receiving speech from the accessory device 100. Likewise, the accessory device 100 includes at least one transceiver 180 for communicating with the mobile stations 20a–c.

To implement the wireless connection, a limited distance transmission system is preferred. As an example, one such system is the Bluetooth system, which provides a point-to-point or point-to-multipoint connection over a short-range radio link in a masterslave relationship. Bluetooth operates in the unlicensed ISM band at 2.4 GigaHertz (GHz). Access to a channel between the various mobile stations 20a–c and the accessory device 100 is controlled by the master, which in this case is the accessory device 100. Speech is transmitted over the channel in packets, with each mobile station 20a–c transmitting the packets in a pseudo-random hopping sequence through the allowed radio frequencies.

As a further alternative, instead of providing a single speaker/microphone 120 (shown in FIG. 1) within the accessory device 100, a hands-free headset 195 can be used by the mobile subscriber to listen and transmit speech to the accessory device 100. The hands-free headset 195 can be connected to the accessory device 100 at a hands-free port 190 of the accessory device 100, as is shown. Alternatively, the Bluetooth system can provide a wireless connection to the hands-free headset 195.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. An accessory device for handling multiple calls on multiple mobile stations, comprising:
   circuitry adapted to connect to at least two mobile stations, each of said at least two mobile stations being involved in a respective call over a respective cellular network, said circuitry being configured to transmit and receive speech associated with said respective calls to and from said at least two mobile stations;
   at least one switch operatively connected to said circuitry, said at least one switch being configured to select at least one of said respective calls; and
   means for transmitting and receiving said speech associated with said at least one selected call to and from a user of said accessory device.

2. The accessory device of claim 1, wherein said circuitry includes at least two ports, each of said at least two ports being connected to receive a respective connector, each of said respective connectors being connected to a respective one of said at least two mobile stations.

3. The accessory device of claim 1, wherein said circuitry includes a transceiver, said transceiver being wirelessly connected to said at least two mobile stations.

4. The accessory device of claim 3, wherein said transceiver is a Bluetooth transceiver.

5. The accessory device of claim 3, wherein means for transmitting and receiving said speech includes said transceiver, said transceiver being connected to wirelessly transmit and receive speech for said at least one selected call to and from a hands-free headset.

6. The accessory device of claim 1, wherein said means for transmitting and receiving includes a combined speaker and microphone.

7. The accessory device of claim 1, wherein said means for transmitting and receiving includes a hands-free port connected to transmit and receive speech for each of said selected calls to and from a hands-free headset.

8. The accessory device of claim 1, further comprising:
   switching circuitry connected to said at least one switch, said switching circuitry being configured to bridge togther at least two of said selected calls into a multi-party call.

9. The accessory device of claim 8, further comprising:
   a battery for providing power to said switching circuitry.

10. The accessory device of claim 1, further comprising:
    volume and gain circuitry connected to said at least one switch for adjusting the volume of said at least one selected call.

11. The accessory device of claim 10, further comprising:
    at least one volume dial connected to said volume and gain circuitry for selecting the volume for said at least one selected call.

12. The accessory device of claim 10, wherein said volume and gain circuitry includes at least one pre-amplifier stage.

13. The accessory device of claim 10, wherein each said at least one switch has a separate one of said volume and gain circuitry associated therewith.

14. A telecommunications system for handling multiple calls associated with at least one mobile subscriber, comprising:
    at least two mobile stations in wireless communication with respective cellular networks, each of said at least two mobile stations being involved in a respective call; and
    an accessory device connected to said at least two mobile stations for selecting at least one of said calls and transmitting and receiving speech associated with said at least one selected call to said at least one mobile subscriber.

15. The telecommunications system of claim 14, wherein said accessory device includes at least one switch for selecting said at least one selected call.

16. The telecommunications system of claim 14, wherein said accessory device includes at least two ports, each of said at least two ports being connected to receive a respective connector, each of said respective connectors being connected to a respective one of said at least two mobile stations.

17. The telecommunications system of claim 14, wherein said accessory device includes a transceiver, said transceiver being wirelessly connected to said at least two mobile stations.

18. The telecommunications system of claim 17, wherein said transceiver is a Bluetooth transceiver, each of said at least two mobile stations having a respective additional Bluetooth transceiver therein.

19. The telecommunications system of claim 17, further comprising:
    a hands-free headset for wirelessly transmitting and receiving speech for said at least one selected call to and from said transceiver.

20. The telecommunications system of claim 14, wherein said accessory device includes a combined speaker and microphone for transmitting and receiving said speech associated with said at least one selected call to said at least one mobile subscriber.

21. The telecommunications system of claim 14, wherein said accessory device includes switching circuitry for bridging togther at least two of said selected calls into a multi-party call.

22. The telecommunications system of claim 14, wherein said accessory device includes volume and gain circuitry for adjusting the volume of said at least one selected call.

23. The telecommunications system of claim 22, wherein said accessory device includes at least one volume dial connected to said volume and gain circuitry for selecting the volume for said at least one selected call.

24. A method for handling multiple calls on multiple mobile stations, comprising the steps of:
    connecting at least two mobile stations to an accessory device, each of said at least two mobile stations being involved in a respective call over a respective cellular network;

selecting at least one of said respective calls on said accessory device; and transmitting and receiving speech associated with said at least one selected call to a user of said accessory device through said accessory device.

25. The method of claim 24, wherein said step of connecting further comprises the step of:

connecting a respective connector from each of said at least two mobile stations to a respective port in said accessory device.

26. The method of claim 24, wherein said step of connecting further comprises the step of:

establishing a wireless connection between said at least two mobile stations and a transceiver in said accessory device.

27. The method of claim 26, wherein said step of transmitting and receiving said speech further comprises the step of:

transmitting and receiving said speech associated with said at least one selected call wirelessly between said transceiver and a hands-free headset.

28. The method of claim 14, wherein said step of transmitting and receiving said speech further comprises the step of:

transmitting and receiving said speech associated with said at least one selected call through a combined speaker and microphone within said accessory device.

29. The method of claim 24, wherein said step of selecting further comprises the step of:

bridging togther at least two of said selected calls into a multi-party call within said accessory device.

30. The method of claim 24, further comprising the step of:

adjusting the volume of said at least one selected call on said accessory device.

\* \* \* \* \*